(12) United States Patent
Gray et al.

(10) Patent No.: US 7,133,752 B2
(45) Date of Patent: Nov. 7, 2006

(54) METHOD OF CHARACTERIZING AN ADULT OCCUPANT OF A VEHICLE SEAT BASED ON A MEASURE OF SEATED WEIGHT

(75) Inventors: Charles A. Gray, Noblesville, IN (US); James F. Patterson, Greentown, IN (US); Jay W Higbee, Tipton, IN (US)

(73) Assignee: Delphi Technologies, Inc., Troy, MI (US)

( * ) Notice: Subject to any disclaimer, the term of this patent is extended or adjusted under 35 U.S.C. 154(b) by 421 days.

(21) Appl. No.: 10/680,534

(22) Filed: Oct. 7, 2003

(65) Prior Publication Data

US 2005/0072618 A1    Apr. 7, 2005

(51) Int. Cl.
*G06F 17/00*    (2006.01)

(52) U.S. Cl. .............................. 701/1; 701/45; 180/273
(58) Field of Classification Search .................... None
See application file for complete search history.

(56) References Cited

U.S. PATENT DOCUMENTS

| | | | |
|---|---|---|---|
| 5,987,370 A | 11/1999 | Murphy et al. ............... 701/45 |
| 6,246,936 B1 | 6/2001 | Murphy et al. | |
| 6,476,516 B1 | 11/2002 | Riech | |
| 6,490,936 B1 | 12/2002 | Fortune et al. ......... 73/862.581 |
| 6,609,054 B1* | 8/2003 | Wallace ....................... 701/45 |
| 6,774,804 B1* | 8/2004 | Sakai et al. ................. 340/665 |
| 2003/0033065 A1 | 2/2003 | Vos et al. | |
| 2003/0149517 A1* | 8/2003 | Murphy et al. ............... 701/45 |

FOREIGN PATENT DOCUMENTS

WO    03/016100    2/2003

* cited by examiner

*Primary Examiner*—Michael J. Zanelli
(74) *Attorney, Agent, or Firm*—Jimmy L. Funke

(57) ABSTRACT

A weight-based occupant characterization method reliably distinguishes between large and small adult occupants by dynamically adjusting a threshold used to distinguish between large and small adult occupants. The threshold adjustments effectively increase the separation between the detected weight and the threshold, minimizing oscillation of the determined characterization following an initial occupant characterization. A learning routine gradually adjusts the threshold up to a predefined maximum adjustment so long as the detected weight is within a tolerance or hysteresis band, or a locking routine produces a step change adjustment of the threshold when the detected weight is outside the tolerance or hysteresis band for at least a predefined time.

7 Claims, 5 Drawing Sheets

METHOD OF CHARACTERIZING AN ADULT OCCUPANT OF A VEHICLE SEAT BASED ON A MEASURE OF SEATED WEIGHT

TECHNICAL FIELD

This invention relates to a method of characterizing an adult occupant of a motor vehicle seat for purposes of controlling air bag deployment based on the seated weight of the occupant.

BACKGROUND OF THE INVENTION

Vehicle occupant seated weight detection systems are useful in connection with air bags and other pyrotechnically deployed restraints as a means of characterizing the occupant. For example, the seated weight of the occupant may be used to distinguish between large and small adults; full deployment force is usually enabled in the case of a large adult, while reduced deployment force is usually enabled in the case of a small adult. In a typical implementation, the detected seated weight is filtered or averaged and compared to a calibrated threshold, where occupant seated weight above the threshold indicates the presence of a large adult, and occupant seated weight below the threshold (but above a minimum adult threshold) indicates the presence of a small adult. A limited degree of threshold hysteresis can be employed to prevent repeated changes in the determined characterization due to minor occupant weight or position shifting. For example, if the occupant is characterized as a large adult, the detected weight would have to fall below the large adult threshold by at least a hysteresis amount (and possibly for at least a calibrated time period) before characterizing the occupant as a small adult. However, such an approach can only account for minor re-positioning of the occupant, and fails to prevent undesired oscillation of the occupant characterization. Accordingly, what is needed is a more robust method of distinguishing between large and small adult seat occupants.

SUMMARY OF THE INVENTION

The present invention is directed to an improved weight-based occupant characterization method that reliably distinguishes between large and small adult occupants. According to the invention, a threshold used to distinguish between large and small adult occupants is dynamically adjusted following an initial characterization of the occupant to effectively increase the separation between the detected weight and the threshold. A learning routine gradually adjusts the threshold up to a predefined maximum adjustment so long as the detected weight is within a tolerance or hysteresis band, or a locking routine produces a step change adjustment of the threshold when the detected weight is outside the tolerance or hysteresis band for at least a predefined time.

BRIEF DESCRIPTION OF THE DRAWINGS

FIG. 2A depicts a learned decrease of the threshold, and FIG. 2B depicts a learned increase of the threshold.

FIG. 3A depicts a step decrease of the threshold, and FIG. 3B depicts a step increase of the threshold.

FIG. 4 depicts a main flow diagram, FIG. 5 depicts a portion of the routine concerning large adult threshold locking logic, and FIG. 6 depicts a portion of the routine concerning large adult threshold learning logic.

DESCRIPTION OF THE PREFERRED EMBODIMENT

The present invention is disclosed in the context of a restraint system for an occupant of a vehicle passenger seat 10, where the occupant weight is detected based on the fluid pressure in a seat cushion bladder 12. In general, however, the present invention applies to other types of weight-based occupant detection systems as well, such as systems that sense the strain in a seat frame element, or systems that include a network of pressure sensitive cells distributed over the seating area.

Figure 1:
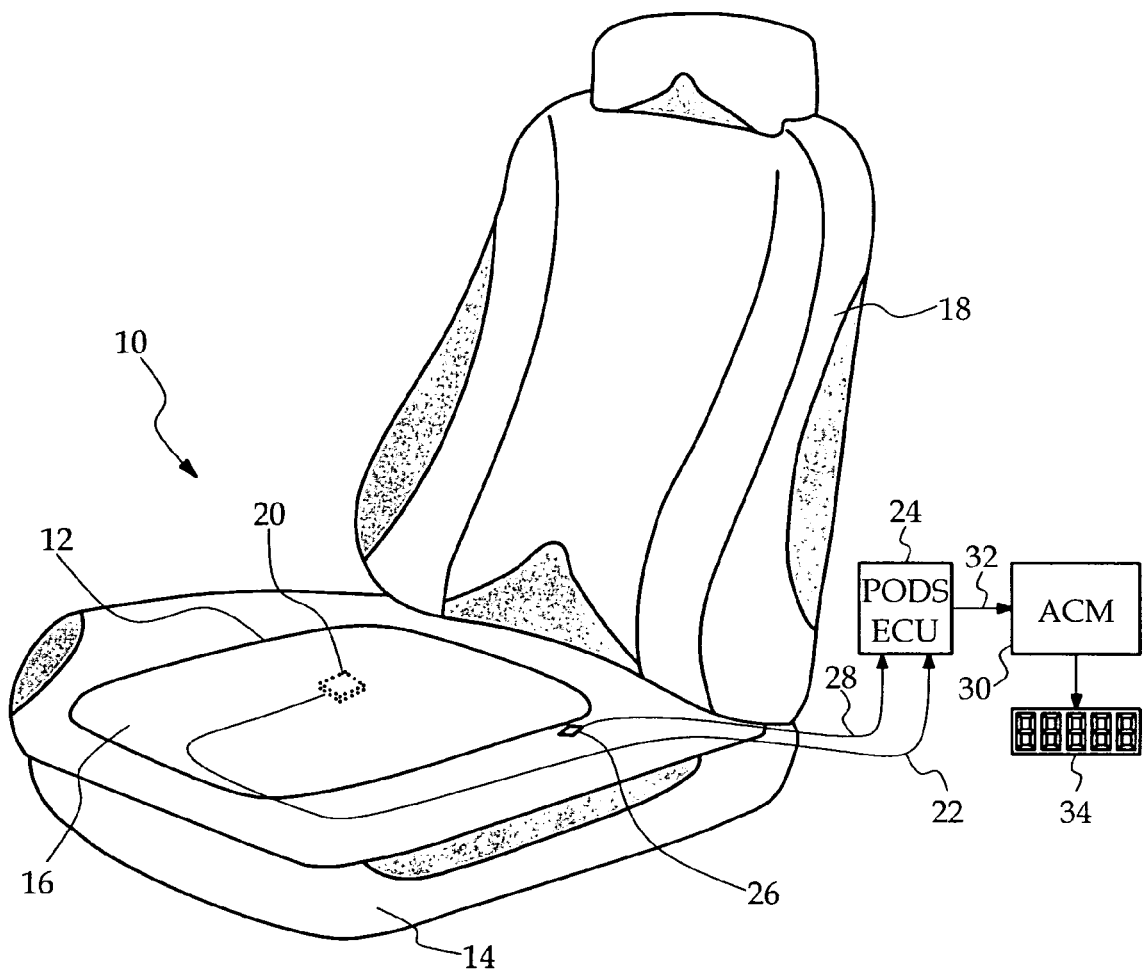
FIG. 1 is a system diagram illustrating a passenger seat of a vehicle equipped with a fluid-filled bladder, an occupant weight detection and characterization electronic control unit (PODS ECU) and an airbag control module (ACM) according to this invention.

Referring to FIG. 1, the vehicle seat 10 is supported on a frame 14, and includes foam cushions 16 and 18 on the seat bottom and back. The bladder 12 is disposed in or under the foam cushion 16 substantially parallel with the central seating surface, and preferably contains a fluid such as silicone which is non-corrosive, and not subject to freezing at extreme ambient temperatures. In addition, semi-rigid interface panels may be placed above and/or beneath the bladder 12 to protect the bladder from puncture damage and to provide a suitable reaction surface, as disclosed for example in the U.S. Pat. No. 6,490,936, assigned to the assignee of the present invention, and incorporated herein by reference. A pressure sensor 20 is responsive to the fluid pressure in bladder 12, and provides a pressure signal on line 22 to a passenger occupant detection system electronic control unit (PODS ECU) 24, and a seat temperature sensor 26 provides a temperature signal on line 28. The PODS ECU 24 characterizes the seat occupant based on the pressure and temperature signals, and provides a characterization signal to airbag control module (ACM) 30 via line 32. The ACM 30 may be conventional in nature, and operates to deploy one or more airbags or other restraint devices (not shown) for vehicle occupant protection based on measured vehicle acceleration and occupant characterization data obtained from PODS ECU 24. If the measured vehicle acceleration is indicative of a severe crash, ACM 30 deploys the restraints at full force if PODS ECU 24 indicates that the occupant is a large adult, and at reduced force if PODS ECU 24 indicates that the occupant is a small adult. In the illustrated embodiment, ACM 30 communicates the occupant characterization status to a driver display device 34 to enable the driver to verify proper system operation.

The primary function of PODS ECU 24 is to estimate occupant weight based on the pressure and temperature signals provided by sensors 20 and 26, as described for example in the U.S. Pat. No. 5,987,370 to Murphy et al. (which is incorporated by reference herein), and to reliably distinguish between a large adult occupant and a small adult occupant. Distinguishing between a large adult and a small adult is achieved by comparing the measured occupant weight (MEAS_WT) to a calibrated large adult threshold THR_LA, corresponding for example to a seated weight of 50 kg (110 lbs). In general, measured occupant seated weight above THR_LA indicates the presence of a large adult occupant, and measured occupant seated weight below THR_LA (but above a minimum adult threshold) indicates the presence of a small adult occupant.

Figure 2A:
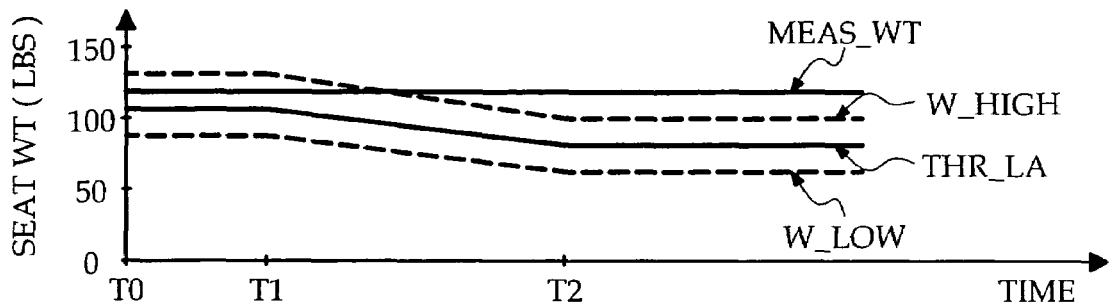
FIGS. 2A and 2B graphically depict a learned gradual adjustment of a calibrated large adult threshold according to this invention.
Figure 2B:
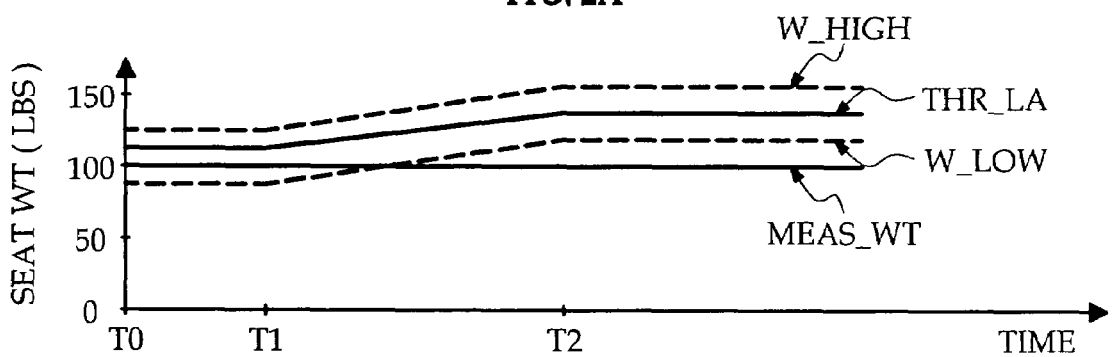
Figure 3A:
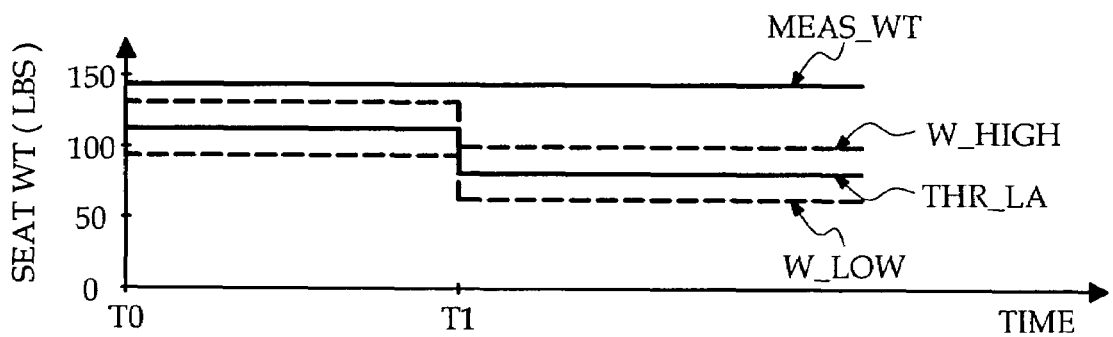
FIGS. 3A and 3B graphically depict a locking step adjustment of a calibrated large adult threshold according to this invention.
Figure 3B:
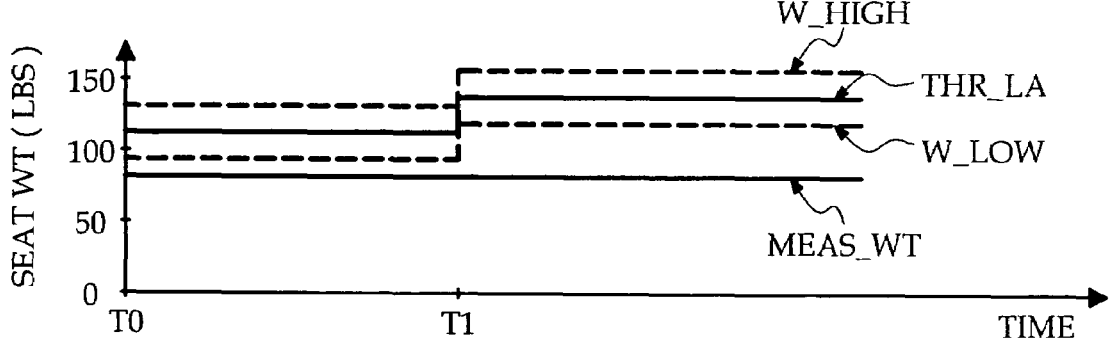

According to the present invention, the threshold THR_LA is automatically and dynamically adjusted following an initial characterization of the occupant as either a large adult or a small adult, and the adjustment widens the existing separation between MEAS_WT and THR_LA to prevent undesired and erroneous oscillation between large and small adult characterizations due to occupant weight shifting and movement. FIGS. 2A–2B graphically depict a progressive adjustment of THR_LA (referred to herein as a learned adjustment) when MEAS_WT is close to but consistently above or consistently below THR_LA. FIGS. 3A–3B graphically depict a one-time step adjustment of the threshold THR_LA (referred to herein as a lock adjustment) when the measured occupant weight is consistently well above or well below THR_LA. Each graph depicts MEAS_WT, the threshold THR_LA, and a tolerance or hysteresis band or window about THR_LA, as a function of time. In the illustrated embodiment, the upper limit W_HIGH of the tolerance window is approximately 2 kg (4.4 lbs) above THR_LA, and the lower limit W_LOW is approximately 2 kg (4.4 lbs) below THR_LA.

In the example of FIG. 2A, MEAS_WT is consistently above the threshold THR_LA, and initially within the tolerance window defined by W_HIGH and W_LOW. If MEAS_WT remains above THR_LA and within the tolerance window for at least a prescribed time such as two minutes, PODS_ECU 24 initiates a progressive reduction of THR_LA, up to a maximum adjustment amount. In FIG. 2A, the adjustment of THR_LA occurs over the interval T1–T2, whereafter THR_LA remains constant. Learning adjustment of the opposite polarity occurs in the example of FIG. 2B where MEAS_WT remains below THR_LA and within the tolerance window for at least a prescribed time such as two minutes. In such case, PODS_ECU 24 initiates a progressive increase of THR_LA, up to a maximum adjustment amount. As in FIG. 2A, the adjustment of THR_LA in FIG. 2B occurs over the interval T1–T2, whereafter THR_LA remains constant. In each case, the adjustment progressively widens an observed consistent separation between MEAS_WT and THR_LA, increasing the apparent hysteresis to prevent undesired and erroneous oscillation between large and small adult characterizations due to occupant weight shifting and movement.

In the example of FIG. 3A, MEAS_WT is consistently above the threshold THR_LA and outside the tolerance window defined by W_HIGH and W_LOW. If MEAS_WT remains above THR_LA and outside the tolerance window for at least a prescribed time such as one minute, PODS_ECU 24 initiates a one-time step reduction of THR_LA by an amount such as 11.4 kg (25 lbs). In FIG. 3A, the adjustment of THR_LA occurs at time T1, whereafter THR_LA remains constant. Step adjustment of the opposite polarity occurs in the example of FIG. 3B where MEAS_WT remains below THR_LA and outside the tolerance window for at least a prescribed time such as one minute. In such case PODS_ECU 24 initiates a step increase of THR_LA by an amount such as 11.4 kg (25 lbs). As in FIG. 3A, the adjustment of THR_LA in FIG. 3B occurs at time T1, whereafter THR_LA remains constant. In each case, the adjustment immediately widens an observed and consistently large separation between MEAS_WT and THR_LA, increasing the apparent hysteresis and effectively locking-in the determined occupant characterization.

Figure 4:
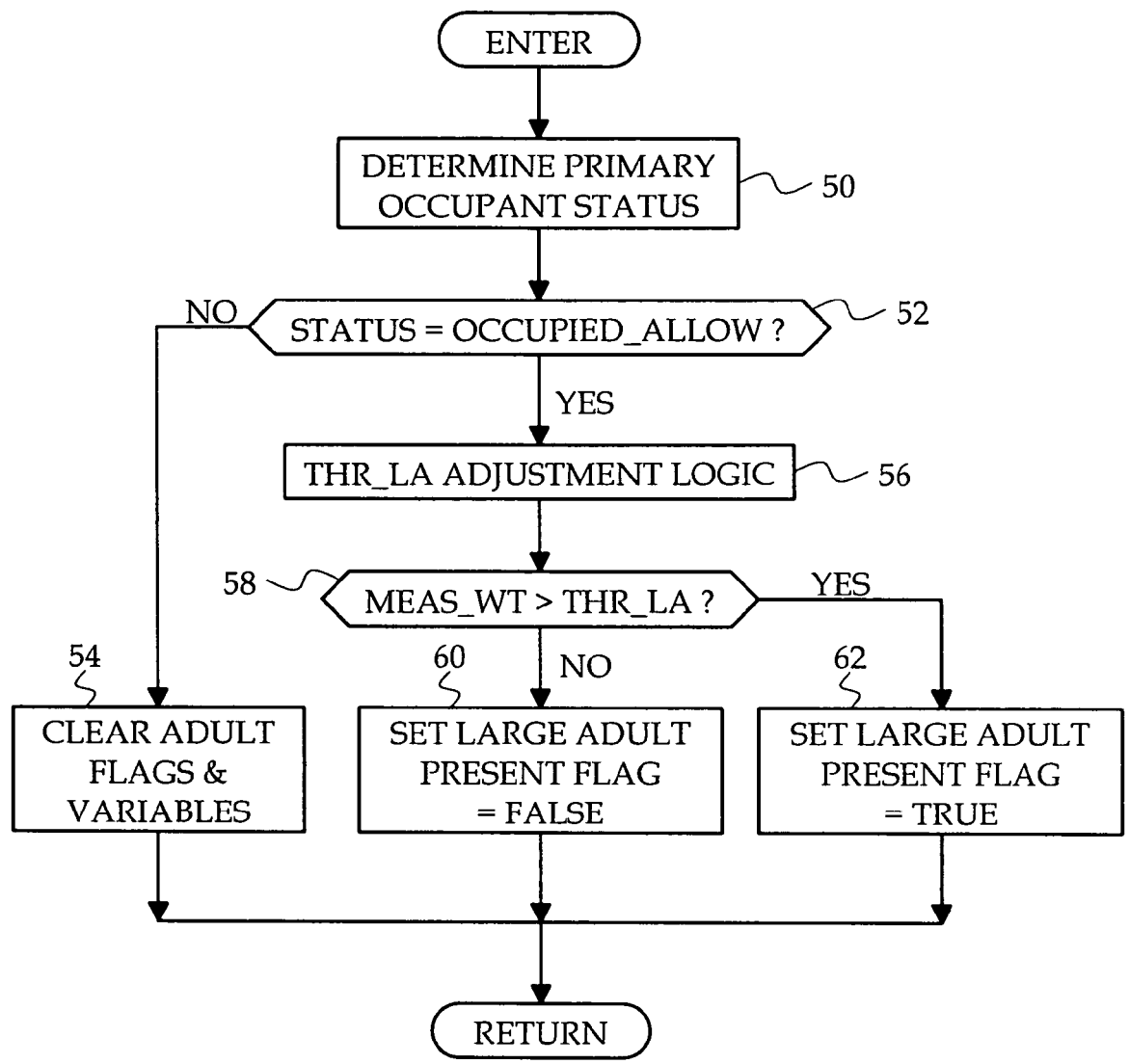
FIGS. 4, 5 and 6 depict flow diagrams representative of software routines executed by the PODS ECU of FIG. 1 in carrying out the method of this invention.
Figure 5:
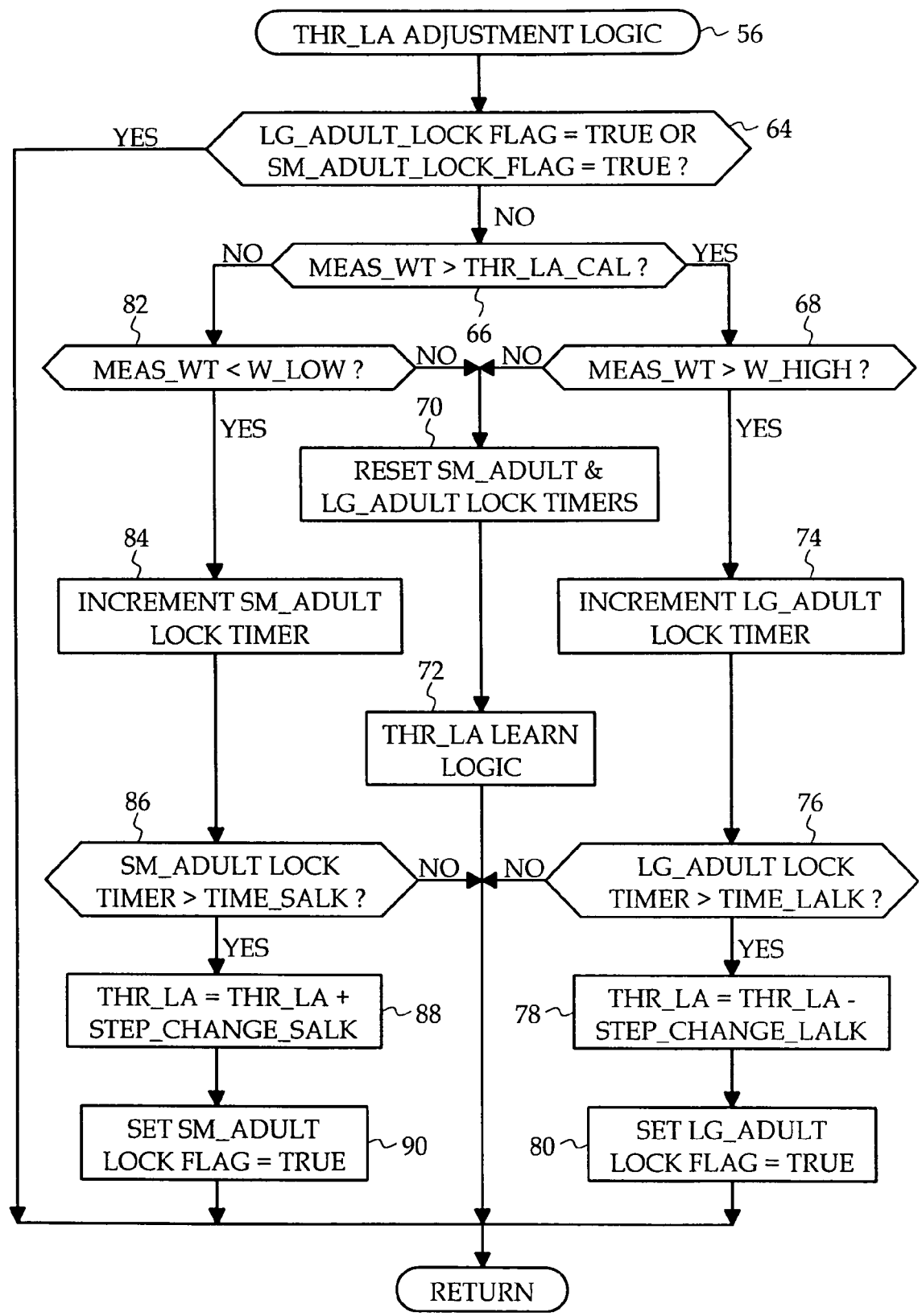
Figure 6:
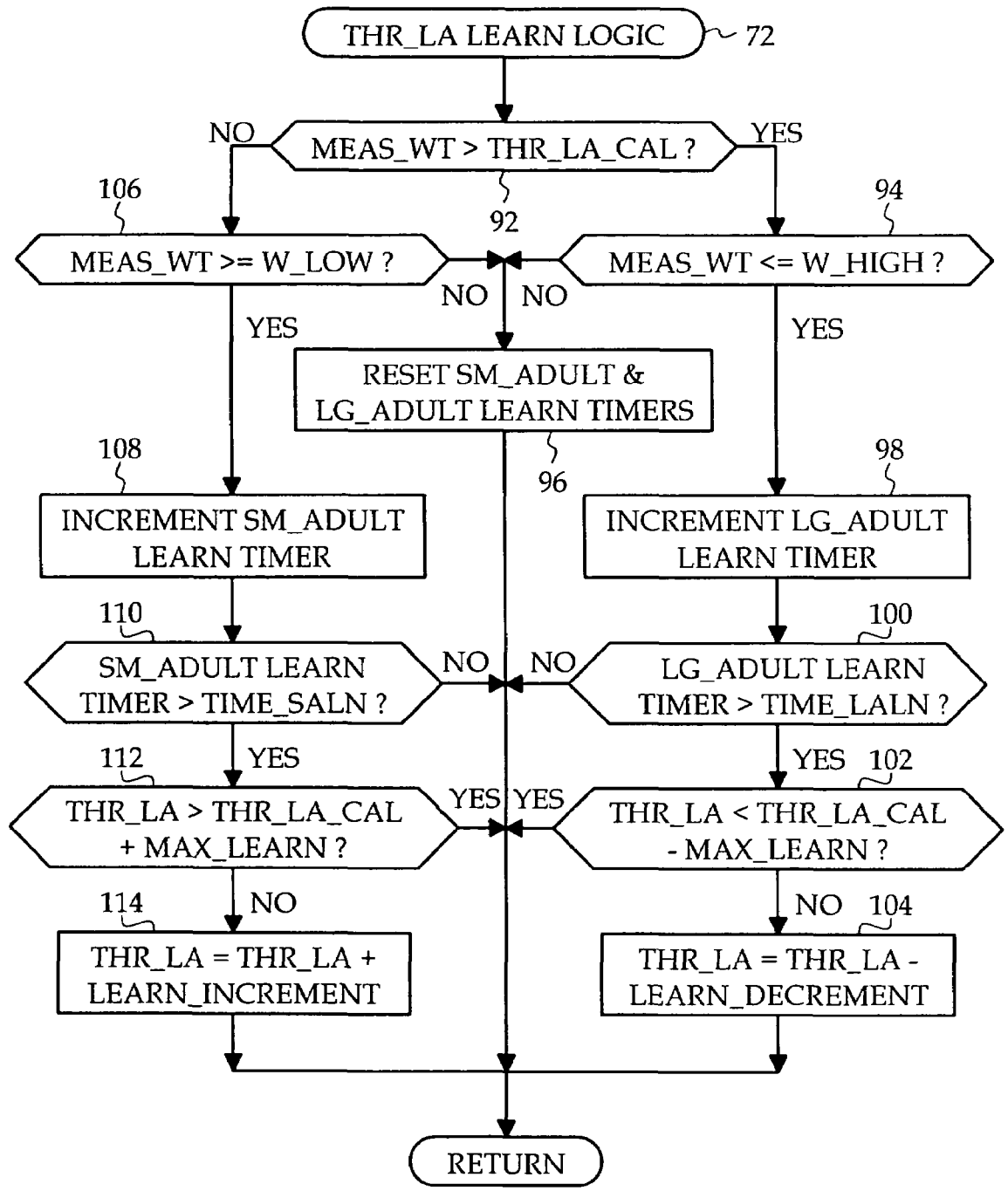

The flow diagrams of FIGS. 4–6 illustrate a software routine periodically executed by the PODS ECU 24 for carrying out the above-described method. The flow diagram of FIG. 4 represents a main or executive routine, whereas the flow diagram of FIG. 5 details the large adult threshold locking adjustment, and the flow diagram of FIG. 6 details the large adult threshold learning adjustment.

The routine depicted in FIG. 4 is periodically executed to determine the primary status of the seat occupant based on detected seated weight, seat belt tension and other factors, as indicated at block 50. For example, the determined status may be EMPTY in the case of a vacant seat, OCCUPIED_DISABLE in the case of an infant seat or a normally seated child, or OCCUPIED_ENABLE in the case of an adult occupant with a seated weight that exceeds a calibrated threshold. If the status is OCCUPIED_ALLOW, as determined at block 52, the blocks 56, 58, 60, 62 are executed to determine if the occupant is a large adult or a small adult, and to set the status of a LARGE_ADULT_PRESENT flag accordingly. In such an implementation, both the determined status, and the pertinent flags are provided to ACM 30 via line 32. If the status is other than OCCUPIED_ALLOW, the block 54 clears the flags and variables used by blocks 56–62. The first step of determining if the occupant is a large adult or a small adult is the setting of the threshold THR_LA by block 56; this step is detailed by the flow diagrams of FIGS. 5–6, explained below. Thereafter, the block 58 compares the measured occupant seated weight MEAS_WT to the threshold THR_LA determined at block 56. If MEAS_WT>THR_LA, the block 62 sets the LARGE_ADULT_PRESENT flag to TRUE; otherwise, the block 60 sets the LARGE_ADULT_PRESENT flag to FALSE.

Referring to threshold adjustment logic routine of FIGS. 5–6, the block 64 is first executed to determine if the LG_ADULT_LOCK or the SMALL_ADULT_LOCK flags have already been set by the routine. Initially, block 64 will be answered in the negative, and block 66 is executed to compare MEAS_WT to a calibrated large adult threshold THR_LA_CAL, which is the initial value of THR_LA. If MEAS_WT>THR_LA_CAL, the presence of a large adult is indicated, and the blocks 68–80 are executed to determine if it is appropriate to increase THR_LA. If MEAS_WT<=THR_LA_CAL, the presence of a small adult is indicated, and the blocks 70–72 and 82–90 are executed to determine if it is appropriate to increase THR_LA. In general, the logic detailed in FIG. 5 determines if it is appropriate to carry out a step adjustment of THR_LA as described above in respect to FIGS. 3A–3B, while the logic detailed in FIG. 6 determines if it is appropriate to carry out a progressive adjustment of THR_LA as described above in respect to FIGS. 2A–2B.

If MEAS_WT is above the upper limit W_HIGH of the threshold tolerance window, as determined by block 68, the block 74 increments a LG_ADULT_LOCK timer, and the block 76 compares the timer value to a reference time TIME_LALK such as one minute. If the timer exceeds TIME_LALK, block 76 is answered in the affirmative, and blocks 78 and 80 are executed to decrease THR_LA by a step change STEP_CHANGE_LALK such as 25 lbs., and to set the LG_ADULT_LOCK flag to TRUE. The LG_ADULT_LOCK timer is reset by block 70 if MEAS_WT falls below W_HIGH, so block 76 is only answered in the affirmative if MEAS_WT is continuously above W_HIGH for at least TIME_LALK. Similarly, the blocks 70, 82, 84 and 86 determine if MEAS_WT is continuously below W_LOW for at least a reference time TIME_SALK such as one minute. If so, the blocks 88 and 90 are executed to increase THR_LA by a step change STEP_CHANGE_SALK such as 25 lbs., and to set the SM ADULT_LOCK flag to TRUE. If the conditions for carrying out a step change in THR_LA are not met, the block 72 (detailed in FIG. 6) is executed to determine if a progressive or learned change in THR_LA is appropriate.

Referring to the THR_LA learn logic of FIG. 6, the blocks 92 and 94 are answered in the affirmative if MEAS_WT is above the calibrated large adult threshold THR_LA_CAL but less than or equal to the upper limit W_HIGH of the threshold tolerance window. In such case, the block 98 increments a LG_ADULT_LEARN timer, and the block 100 compares the timer value to a reference time TIME_LALN such as two minutes. If the timer exceeds TIME_LALN, block 100 is answered in the affirmative, and blocks 102 and 104 decrease THR_LA by a learning decrement LEARN_DECREMENT such as two lbs., provided that THR_LA is not already below its calibrated value THR_LA_CAL by more than a maximum leaning amount MAX_LEARN. The LG_ADULT_LEARN timer is reset by block 96 if MEAS_WT falls below W_HIGH, so block 100 is only answered in the affirmative if the conditions of blocks 92 and 94 are met for at least TIME_LALN. In a similar manner, the blocks 92, 96, 106, 108 and 110 determine if MEAS_WT is continuously below the calibrated large adult threshold THR_LA_CAL but greater than or equal to the lower limit W_LOW of the threshold tolerance window for at least a reference time TIME_SALN such as one minute. If so, the blocks 112 and 114 increase THR_LA by a learning increment LEARN_INCREMENT such as two lbs., provided that THR_LA is not already above its calibrated value THR_LA_CAL by more than the maximum leaning amount MAX_LEARN.

In summary, the method of the present invention reliably distinguishes between a large adult and a small adult occupant by dynamically adjusting a threshold used to distinguish between large and small adult occupants. The threshold adjustments effectively increase the separation between the detected weight and the threshold, thereby minimizing oscillation of the determined characterization following an initial occupant characterization. While illustrated in reference to the illustrated embodiment, it is expected that various modifications will occur to persons skilled in the art. For example, this invention is not limited to pressure based bladder systems, and may be applied equally as well to other occupant detection systems, as indicated above. Accordingly, it should be understood that occupant characterization methods incorporating these and other modifications may fall within the scope of this invention, which is defined by the appended claims.

The invention claimed is:

1. A method of distinguishing between large adult and small adult occupants of a vehicle seat based on a comparison of a measured seated weight of an occupant to a weight threshold having an initial calibrated value, comprising the steps of:
   detecting a condition for which the measured seated weight is consistently above the weight threshold or consistently below the weight threshold for at least a predefined time interval;
   defining a tolerance window about said threshold; and
   adjusting the threshold and the threshold window in response to the detected condition so as to increase a separation between the threshold and the measured seated weight.

2. A method of distinguishing between large adult and small adult occupants of a vehicle seat based on a comparison of a measured seated weight of an occupant to a weight threshold having an initial calibrated value, comprising the steps of:
   detecting a condition for which the measured seated weight is consistently above the weight threshold or consistently below the weight threshold for at least a predefined time interval;
   adjusting the threshold in response to the detected condition so as to increase a separation between the threshold and the measured seated weight;
   defining a tolerance window about said threshold, and detecting a threshold learning condition for which the measured seated weight is consistently above the weight threshold or consistently below the weight threshold, but within said tolerance window, for at least said predefined time interval; and
   carrying out a progressive adjustment of the threshold in a direction to increase the separation between the threshold and the measured seated weight so long as the threshold learning condition is detected.

3. The method of claim 2, including the step of:
   interrupting the progressive adjustment of the threshold when a difference between the threshold and said calibrated value reaches a maximum adjustment value.

4. A method of distinguishing between large adult and small adult occupants of a vehicle seat based on a comparison of a measured seated weight of an occupant to a weight threshold having an initial calibrated value, comprising the steps of:
   detecting a condition for which the measured seated weight is consistently above the weight threshold or consistently below the weight threshold for at least a predefined time interval;
   adjusting the threshold in response to the detected condition so as to increase a separation between the threshold and the measured seated weight;
   defining a tolerance window about said threshold, and detecting a threshold locking condition for which the measured seated weight is consistently above the weight threshold or consistently below the weight threshold, and outside said tolerance window, for at least said predefined time interval; and
   carrying out a step adjustment of the threshold to immediately increase the separation between the threshold and the measured seated weight in response to detection of the threshold locking condition.

5. A method of distinguishing between large adult and small adult occupants of a vehicle seat based on a comparison of a measured seated weight of an occupant to a weight threshold having an initial calibrated value, comprising the steps of:
   detecting a condition for which the measured seated weight is consistently above the weight threshold or consistently below the weight threshold for at least a predefined time interval;
   adjusting the threshold in response to the detected condition so as to increase a separation between the threshold and the measured seated weight;
   defining a tolerance window about said threshold;
   detecting a threshold locking condition for which the measured seated weight is consistently above the weight threshold or consistently below the weight threshold, and outside said tolerance window, for at least a first predefined time interval; and if said threshold locking condition is not detected, detecting a threshold learning condition for which the measured seated weight is consistently above the weight threshold or consistently below the weight threshold, but within said tolerance window, for at least a second predefined time interval.

6. The method of claim 5, including the steps of:

carrying out a step adjustment of the threshold to immediately increase the separation between the threshold and the measured seated weight if the threshold locking condition is detected; and carrying out a progressive adjustment of the threshold in a direction to increase the separation between the threshold and the measured seated weight if the threshold locking condition is not detected and the threshold learning condition is detected.

7. The method of claim 6, including the step of:

interrupting said progressive adjustment of the threshold when a difference between the threshold and said calibrated value reaches a maximum adjustment value.

* * * * *